J. A. CHEAPE.
RACK FOR AUTOMOBILE TIRES.
APPLICATION FILED APR. 28, 1920.
1,355,033.
Patented Oct. 5, 1920.
2 SHEETS—SHEET 1.
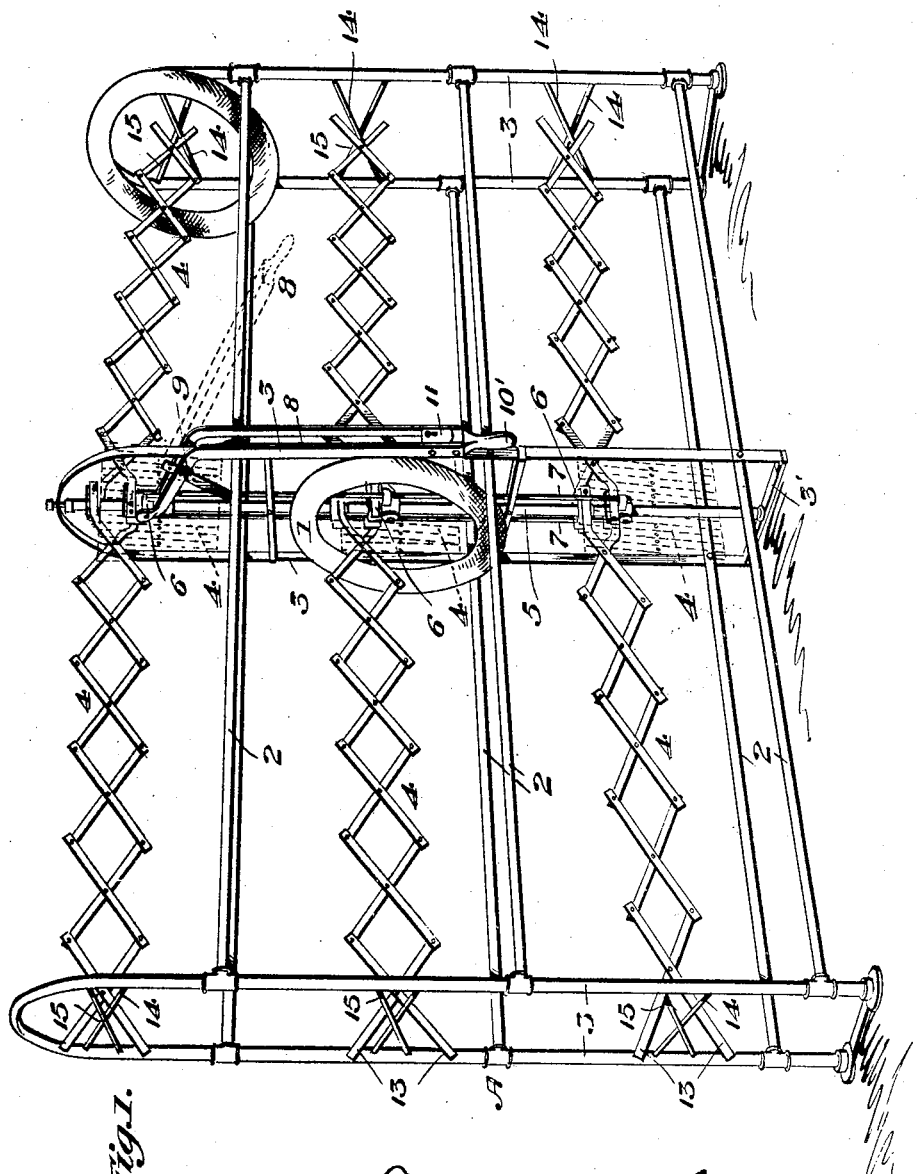

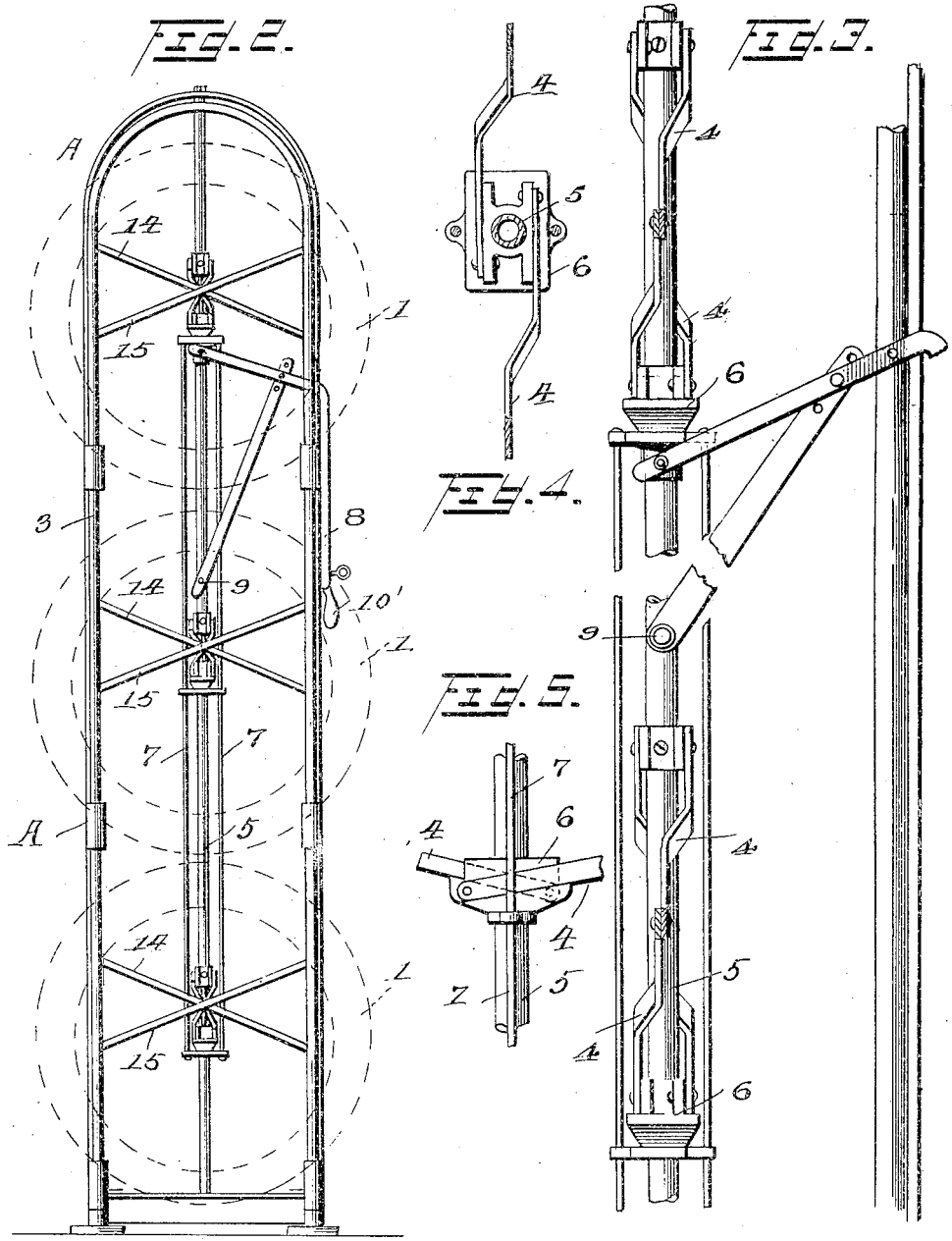

UNITED STATES PATENT OFFICE.

JOHN ALBERT CHEAPE, OF CHARLOTTESVILLE, VIRGINIA.

RACK FOR AUTOMOBILE-TIRES.

1,355,033. Specification of Letters Patent. Patented Oct. 5, 1920.

Application filed April 28, 1920. Serial No. 377,202.

*To all whom it may concern:*

Be it known that I, JOHN ALBERT CHEAPE, a subject of the King of Great Britain, residing at Charlottesville, in the county of Albemarle and State of Virginia, have invented certain new and useful Improvements in Racks for Automobile-Tires, of which the following is a specification.

My invention relates to an improvement in racks for automobile tires.

Racks of this general character when filled to capacity frequently hold several thousand dollars worth of tires, and have no means of preventing the theft or unauthorized appropriation of the goods, which may easily amount to a considerable loss to the dealer or agent.

The object of this invention is to provide means for doing this, and for simultaneously locking the entire complement of the rack, or, when desired, for releasing the same. My invention consists in a framework for the support of the tires vertically, and an extensible lock adapted to be projected through the several tires and locked in this position, whereby the unauthorized removal of a single tire is absolutely precluded, the entire locking mechanism being within the control of a responsible person with a key or other means of securing the lock mechanism.

In the accompanying drawings:

Figure 1 is a side elevation of a rack with a little less than one-half thereof broken away;

Fig. 2 is an end view;

Fig. 3 is an enlarged detail in vertical transverse section;

Fig. 4 is a plan view of a fragment taken at the center of the rack;

Fig. 5 is a similar view of the same in side elevation.

A, represents the rack conveniently made of tubing and suitable couplings of the required dimensions, the same being of less width than the diameter of the tires to be supported thereon, since the tires 1 (whether large or small) rest transversely within the confines of the spaces bounded by the horizontal tubes 2 of the rack, as shown in Figs. 1 and 2. These tubes 2 constitute the sole bottom support for the tires, while the vertical tubes 3—whether at the end or center—afford lateral support at the ends and hold the tires upright, one leaning upon another as illustrated in Fig. 1. The central uprights 3 are adapted to be connected at their bottoms by a horizontal member 3', which in turn may be secured to the floor.

My invention contemplates any extensible means capable of being projected through the centers of these tires as they rest in different tiers, three horizontal tiers in number being shown, extending in pairs from the center to the end of the rack, making six spaces in all in the particular rack illustrated. As illustrative of one practical means of simultaneously locking the entire complement of tires, I have adopted the lazy tongs 4. These are projected simultaneously from the center in opposite directions through the centers of the tires, one member of their inner ends being pivoted to the central upright 5 at a fixed point, and the corresponding ends to a slide 6.

These slides are connected in any convenient manner as by rods 7, so that they are moved simultaneously, and as a means for operating the slides 6 and consequently the lazy-tongs 4, the hand-lever 8 is provided. This is pivoted at 9 to the central upright, and preferably consists of parallel members connected at their outer ends with a handle 10', into which is built a lock 11, which is arranged to automatically lock to one of the vertical uprights 3, serving as a convenient means for effecting a ready locking of the parts in the projected position. When projected, the outer ends 13 of the toggle-joint levers straddle the diagonally crossed bracing-tubes 14 and 15, which arrangement serves to guide the outer end of the toggle-levers toward the center of the frame, where their outer ends meet, as disclosed in Fig. 1, thus forming a support for the toggle levers at their outer ends, and prevent their being swung aside from their predetermined positions, locking the tires in the rack.

In this simple manner, the entire rack full of tires is simultaneously locked from a common central point by the actuation of a hand-lever common to all, which when swung to its normal position latches itself and cannot be released until by the use of a key, as with any other lock.

I claim:

1. A tire rack including a frame for the support of the tires, and collapsible means capable of being projected through the tires to prevent their surreptitious removal from the frame.

2. A tire rack including a frame for the support of tires, and collapsible means capable of being projected successively through the tires to be locked to prevent surreptitious removal from the frame.

3. A tire rack comprising a frame and an extensible means supported centrally, with common means for projecting the extensible device in opposite directions to simultaneously pass through the tires, for locking them in the rack.

4. A tire rack including a frame in which tires are supported on edge, an extensible device in position to be projected through the tires, a lever for actuating the extensible means, and means for securing the extensible means in locked position.

5. A tire rack including a frame in which the tires are supported on edge, extensible devices arranged centrally of the frame adapted to be projected outwardly in opposite directions through the tires and register with the outer end members of the frame, an actuating lever common to the several extensible devices, and means for locking the lever in one position for securing the extensible devices in their locked position.

In testimony whereof I affix my signature.

JOHN ALBERT CHEAPE.